United States Patent [19]
Vezzani

[11] Patent Number: 4,869,914
[45] Date of Patent: Sep. 26, 1989

[54] METHOD OF MAKING DUMPLINGS

[75] Inventor: Pompeo Vezzani, Milan, Italy

[73] Assignee: Domus Pompei S.r.l., Milan, Italy

[21] Appl. No.: 112,537

[22] Filed: Oct. 22, 1987

[30] Foreign Application Priority Data

Oct. 27, 1986 [IT] Italy ................ 22149 A/86

[51] Int. Cl.$^4$ ............ A21C 3/04; A21C 11/16; A21D 8/00
[52] U.S. Cl. .................. 426/549; 426/497; 426/516; 426/518; 426/519; 99/348
[58] Field of Search .......... 426/496, 549, 557, 451, 426/497, 503, 504, 516, 517, 518, 519; 99/348; 366/307

[56] References Cited

U.S. PATENT DOCUMENTS

| 4,540,592 | 9/1985 | Myer et al. | 426/516 |
| 4,675,199 | 6/1987 | Hsu | 426/557 |
| 4,732,775 | 3/1988 | Millauer | 426/516 |

Primary Examiner—Marianne Cintins
Attorney, Agent, or Firm—Davis Hoxie Faithfull & Hapgood

[57] ABSTRACT

A method of making dumplings is disclosed wherein preselected dough ingredients are fed into a cylindrical vessel having a heated inner wall and a rotating fitted shaft provided with a plurality of paddles; and mixed to form a dough which is subsequently cooked, extruded and cut.

4 Claims, 1 Drawing Sheet

METHOD OF MAKING DUMPLINGS

This invention relates to a method of making dumplings on an industrial or semi-industrial scale. In particular, the method with which this invention is concerned is of a type comprising a step of mixing and simultaneously cooking preselected ingredients, at least one of which ingredients contains starch, to obtain a dough wherein substantially all of the starch has been gelled.

It may be appreciated that by the term of "dumpling" a food product is meant which is formed from a dough (basically comprised of flour, water, and salt) which includes a gelled mass of starch, such as wheat starch, potato starch, etc., and mixtures thereof. (In the ensuing description and appended claims, such a dough will be more simply referred to as "gelled dough".)

To prepare the aforesaid dough, vessels are usually employed into which set amounts of preselected ingredients are subjected to a simultaneous mixing and cooking process.

The term "cooking" refers herein to a step of gradual application of heat to the dough being formed, until a higher temperature than 75°–80° C., preferably within the range of 80° C. to 90° C., is reached at which the starch contained in the ingredients undergoes swelling and gelling in a well-known manner.

The temperature and mixing are then maintained at least until all of the starch has gelled.

To promote formation of a gelled dough, water at about 90° C. is normally loaded into the cooking vessel (cooker).

The gelled dough obtained in the above-outlined conditions is specially soft and is discharged as such from the cooking vessel and supplied to a successive forming step.

Dough forming is basically accomplished by extruding the gelled dough through one or more holes in a suitable die, cutting the extruded dough rod(s) into cylindrical segments or pieces, and if desired, finally passing the resulting segments over a fluted roll while subjecting them to a squeezing action.

Extrusion of the gelled dough is accomplished on a press wherein one or more augers are operative to press the dough against the extrusion die. It is to be observed first and foremost that in passing from the cooker to the extruder the gelled dough is cooled inevitably, this cooling initiating a static backgrading of the starch structure therein. The extent of such backgrading is known to be proportional to the dough cooking temperature, residence time, and cooling in the transition from the cooker to the extruder.

The powerful mechanical action exerted by the augers on the backgraded dough is such as to produce substantial breaking up of its bearing structure (the lattice formed by the gelled starch) due to a large proportion of the chemical bonds formed during the cooking step being broken. As a result, the dough takes an amorphous consistency, losing its traditional and advantageous soft character as imparted by cooking. The freshly formed dumplings collapse and meet the market requirements no longer.

This unfavorable effect is enhanced by the dough being cooled to a lower temperture than 70° C. in going from the cooker to the extruder because of increased starch backgrading.

In an effort to obviate this problem (i.e. cooling of the gelled dough to temperatures below 70° C. during the extrusion process), it has been proposed to raise the cooker temperature. However, it is a well-recognized fact that at cooking tempertures in excess of 90° C., the gelled dough rapidly loses its organoleptic and nutritive properties to an unacceptable degree.

Another drawback brought about by the use of augers for extruding is that a large proportion of the material being processed, on approaching the extrusion die, is diverted back into the extruder, to be again picked up by the augers and pushed toward the extrusion die. This part of the dough is therefore subjected to increased mechanical stress and will exhibit, accordingly, enhanced break-up problems of the gel bearing structure. Furthermore, this added weakening of the cooked and gelled dough yields dumplings of reduced resistance to cooking by dipping into boiling water, which harms both the product quality and its storage life.

It should be lastly noted that the compressing the cooked and gelled dough during the extrusion step extracts from it a large proportion of the air that it had taken in while being cooked. Consequently, the end product is bound to be denser, heavier, and quite reluctant to float up and thus signify the consumer of that the optimum cooking stage has been reached.

Additional problems are encountered in cutting the extruded dough rod down into a plurality of pieces. In fact, this cutting operation is known to have involved recourse to generous sprinkling with flour to prevent the dough inherent tackiness from hindering the cutting operation. However, the use of flour for that purpose involves a serious hazard of a microbiological nature in that, whereas with a cooked dough a satisfactory pasteurization level is easily achieved, the same effect is not obtainable on raw flour. As a result, the end product (dumplings) is apt to be formed from a dough which has been re-contaminated by the very flour used in a "raw" state to prevent sticking. Further, the fact that the excess flour is cycled back several times before it is "used up" to cover a dumpling, aggravates the incidence of contaminatin at unacceptable levels by currently applicable health regulatory bodies.

This serious problem is also experienced when the dumplings are subjected to a fluting step wherein flour is used as a releasing agent.

In the light of the above considerations, the technical problem underlying this invention is to provide amethod of making dumplings which can overcome all of the drawbacks set forth above in connection with the prior art.

This problem is solved according to the invention by a method being characterized wherein the dough is extruded directly out of the vessel wherein it is formed, to yield a cooked extruded dough rod.

In accordance with one aspect of the inventive method, the aforesaid dough is formed continuously in said vessel and continuously extruded therefrom to provide a continuous rod of dough which is then cut down into segments or pieces of a set length immediately on exiting said vessel.

According to a further aspect of the inventive method, the dough extrusion is accomplished by subjecting the dough to centrifugation within said vessel.

The advantages afforded by a method according to this invention reside essentially in that extruding a gelled dough directly from the vessel (cooking vessel or cooker) wherein it is formed enables, cooking at an optimum starch gelling temperature, and therefore, a specially soft dough can be obtained which retains all the organoleptic characteristics of the product,. In addition, since no temperature drop occurs, a cooked dough having an intact bearing structure (gelled is extruded in optimum conditions starch) to yield an extruded dough rod which exhibits substantially no tackiness.

The latter feature enables, in turn, cutting the dough rod into segments or pieces of a set length without resorting to the traditional sprinkling with raw flour, thus avoiding all the problems which associate with it.

Extrusion by centrifuging the gelled dough enables the extrusion process to be carried out with a mild mechanical stress on the dough, and hence, with negligible, if any, mechanical stress applied to the bonds of the starch gel structure. The required "pressure" by the extrusion step of this invention, in view of the soft and substantially non-tacky character of the dough being extruded, is adequate to confer on the extrudate sufficient compaction to withstand the successive cut into segments.

Further features and advantages of the invention will be more clearly understood from the following detailed description of an exemplary embodiment of a method of making dumplings, to be taken in conjunction with the accompanying illustrative and non-limitative drawings, where:

Figure 1:
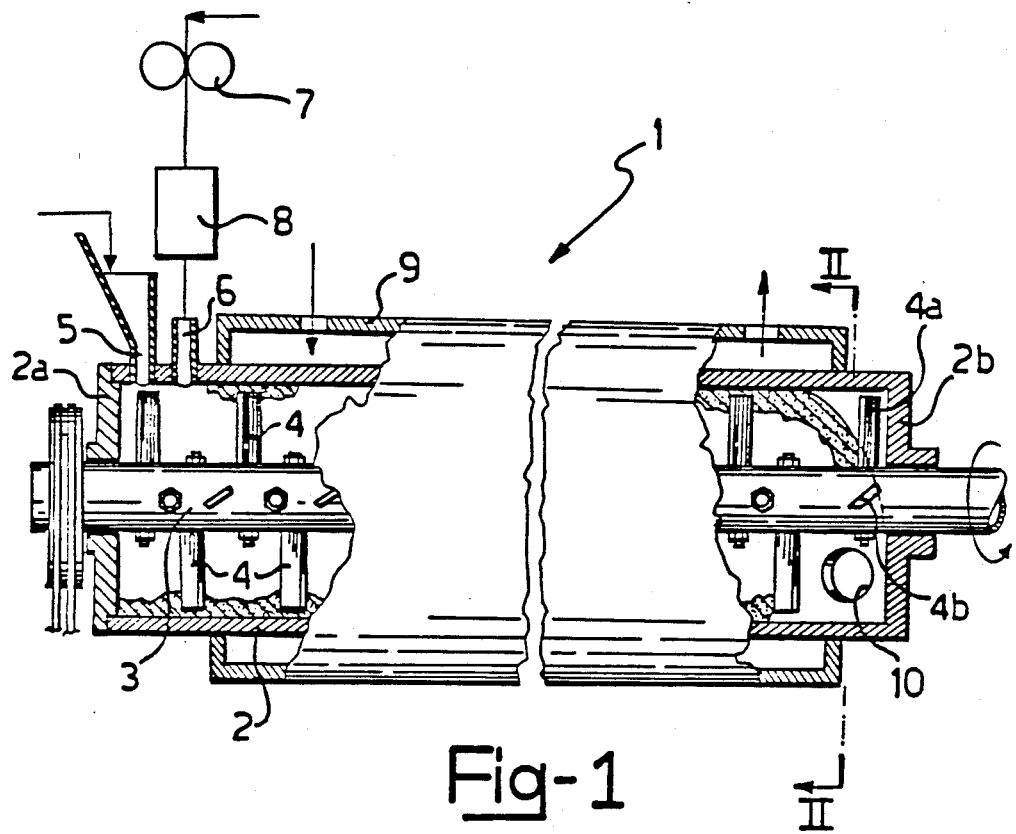
FIG. 1 shows in diagramatic form an apparatus for use in this invention.
Figure 2:
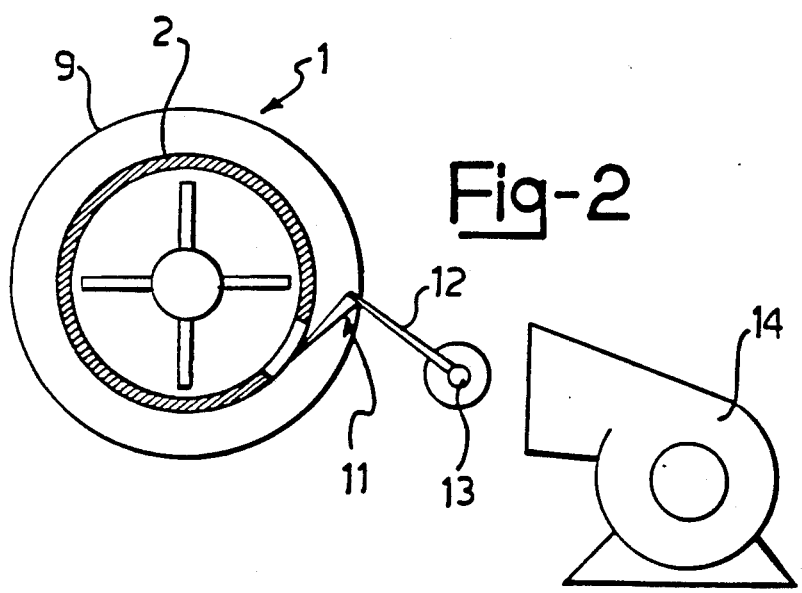
FIG. 2 is a diagramatic sectional view taken along the line II—II in FIG. 1.

With reference to the drawings, the numeral 1 designates schematically and comprehensively a cooker comprising a cylindrical vessel 2 having a drive shaft 3 journalled therein by conventional means, not shown, which is provided with a plurality of paddles 4 extending in a substantially radial direction and disposed in a helical arrangement. The cylindrical vessel 2 is formed, at one end 2a thereof, with openings 5,6 for respectively introducing into it a stream of flow of wheat or another cereal or tuber such as potato, manioca, etc., and water as optionally metered out by a specially provided pump 7 and heated to a set temperature after flowing through a heat exchanger 8.

The vessel 2 is provided with a heating jacket 9 through which a conventional heating fluid, such as hot water, steam, diathermic oil, and the like, is circulated. At the other end 2b of the cylindrical vessel 2, through the outer wall thereof, there is cut or otherwise formed an opening 10, with the paddles 4a,4b, lying between said openings 10 and the vessel end 2b, being paddles of the so-called "hold-back" type whose function will be explained hereinafter.

Arranged to operate at the opening 10 is a cutting device schematically indicated at 11, which may comprise one or more knives carried on the end of an arm 12. The other end of arm 12 is mounted to a drive shaft 13. The arm 12 turns about the axis of the shaft 13 and its length is selected to have the cutting edge(s) of the knife (or knives) 11 follow a tangent travel path to the opening 10 in the vessel 2.

It should be noted that the shaft 13 may be the paddle-fitted shaft 3 itself or be a separate shaft lying parallel to the shaft 3.

A fan, schematically indicated at 14, is arranged to direct a stream of cooling air toward the wall portion of the vessel 2 formed with the opening 10.

A further cooling system is indicated schematically at 15 and may comprise, for example, a horizontal fluidized bed of either the so-called flow freezer or of the type of a vibratory shaking machine.

A flour or mixture of flours containing starch and heated water is fed through the respective inlet openings 5 and 6 in metered amounts and continuously into the cooker 1, wherein the paddle-fitted shaft 3 is kept rotating at a set rpm. Immediately on entering said cooker, the water and flours meet the paddles 4 and are finely dispersed and blended together thereby. Intimate wetting of each individual flour particle is thus advantageously ensured. On wetting, a dough begins to form which is kept under constant and continued mixing and driven, on account of the paddle 4 setting, toward the end 2b of the cooker. During this continuous forward movement, heat is gradually applied of the dough on a continuous basis until temperatures are reached at which the strach, present from the start in the flours, undergoes the well-known phenomenon of gelling. The temperature of the input water, temperature of the vessel 2, and rpm of the shaft are preset such that substantially all the starch in the formed dough has been gelled prior to the dough reaching the openings 10. Further, the shaft rpm, shape and setting of the paddles 4 are selected such that the dough can be centrifuged against the inner wall of the vessel 2 while moving toward the opening 10.

The hold-back paddles 4a and 4b prevent portions of the dough from moving past said opening 10.

On reaching this opening, the dough will be squeezed out through it by the centrifugal force applied to the dough by the rotating paddle-fitted shaft 3. The size of this opening and flow rate of the dough inside the cooker are interrelated, such that the dough exiting through said opening undergoes a mechanical action which is substantially comparable to that of an extrusion process, to form a rod of gelled dough having a cross-sectional shape similar to said opening 10.

Immediately on flowing out of said opening 10, the dough rod is subjected to the cutting action by the device 11-12 to produce a succession of segments which, as cooled by the airflow from the fan 14, collect on the cooling system 15.

It should be noted that the dough being continuously produced in the vessel 2 is extruded continuously and directly out of said vessel through the opening 10, at a stage of maximum starch gelling, by the thrust of a centrifugal force that bears no relation to the conventional (mechanical) force traditionally applied by the augers. The extruded dough rod having been subjected to no physical stressing, it will retain all the air incorporated to the dough within the vessel 2 and keep its bearing structure (consisting of gelled starch) unaltered, to become uniquely soft, supple, and yielding; it has also very little tackiness, such that cutting down into segments or pieces can be carried out advantageously without using flour or any other kind of release agent. From this point of view, the dumplings so obtained are a considerable improvement over conventional ones as regards the microbiological aspect.

A further significant advantage is the ability to change the shape and outward appearance of the resulting dumplings by varying the shape and contour design of the extrusion opening 10. The dumplings are in a finished state since leaving the cooker.

While reference has been made in the foregoing description to the making of dumplings, the method of this invention may also be useful in the production of generally similar or related products, such as croquettes, meat balls, mashed potatoes, couscous, etc., which all present the same technical problem. The protection scope of this invention is therefore understood to also encompass the making of such products.

I claim:

1. A method of making dumplings comprising;

continuously feeding preselected ingredients, at least one of which contains starch, into a cylindrical vessel having a heated inner wall and a rotating fitted shaft provided with a plurality of paddles, said paddles extending substantially radially from said shaft toward said wall;

mixing said ingredients to form a dough;

generating a centrifugal force by said rotating shaft;

driving said dough against said heated inner wall by said centrifugal force generated by said rotating paddle fitted shaft;

continuously moving said dough along said wall toward an extrusion opening in said vessel by said centrifugal force;

cooking said dough by said dough's contact with said heated inner wall, said heated inner wall having a temperature sufficient to cook said dough;

squeezing said dough through said opening in said vessel by said centrifugal force, to form an extruded dough rod; and cutting said extruded dough rod into segments of a set length.

2. The method of claim 1 wherein said extruded dough is cut immediately upon exiting said opening.

3. The method of claim 1 further comprising maintaining said dough in contact with said heated inner wall essentially until said dough is squeezed out of said vessel, to prevent said dough from cooling.

4. The method of claim 3 wherein in said squeezing step, said dough maintains essentially all air it has absorbed.

* * * * *

UNITED STATES PATENT AND TRADEMARK OFFICE
CERTIFICATE OF CORRECTION

PATENT NO. : 4,869,914

DATED : September 26, 1989

INVENTOR(S) : Vezzani, Pompeo

It is certified that error appears in the above—identified patent and that said Letters Patent is hereby corrected as shown below:

Column 3, lines 3 - 4, delete "is extruded in optimum conditions" within the parenthesis and insert -- is extruded in optimum conditions -- before "to yield".

Signed and Sealed this

Twelfth Day of March, 1991

Attest:

HARRY F. MANBECK, JR.

Attesting Officer

Commissioner of Patents and Trademarks